Sept. 4, 1928.  
J. T. JANETTE  
MOTOR AND PUMP  
Filed July 30, 1923
1,682,788
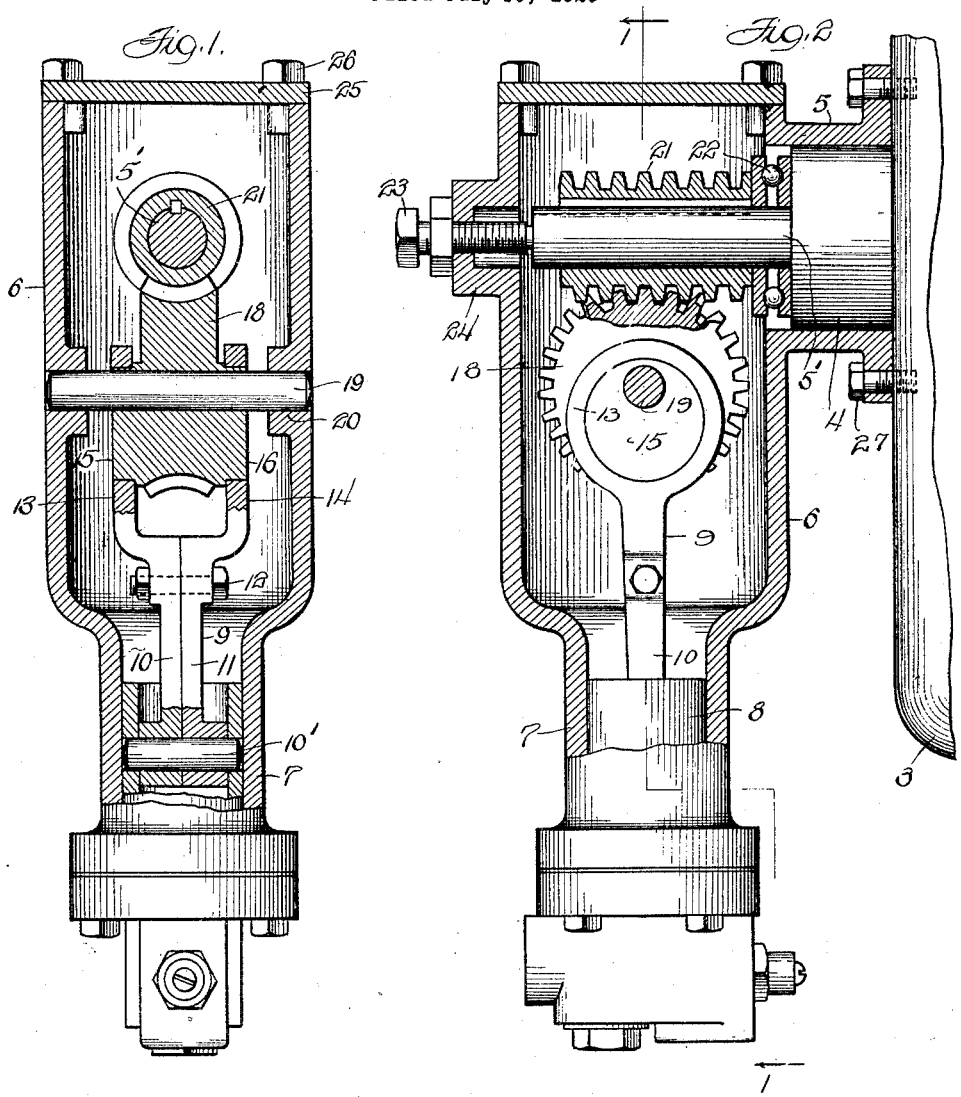
Inventor:
JOHN T. JANETTE
By Glenn S. Noble
Atty Patented Sept. 4, 1928.

1,682,788

UNITED STATES PATENT OFFICE.

JOHN T. JANETTE, OF CHICAGO, ILLINOIS.

MOTOR AND PUMP.

Application filed July 30, 1923. Serial No. 654,676.

This invention relates more particularly to the novel construction of a pump such as is adapted to be driven by an electric motor and to the mounting of the pump on the motor and the driving connection from the motor to the pump. Pumps of this character are adapted to be used in connection with fuel oil heating systems for pumping the fuel or may be used for any other desired purpose.

The objects of this invention are to provide an improved pump mounting; to provide a simple and efficient driving connection between a motor and pump; to provide a pump having novel driving means which is housed so that it may be conveniently operated in oil or grease; to provide a novel form of connecting rod for a pump or engine; and in general to provide such an improved construction as will be described more fully hereinafter.

In the accompanying drawing illustrating this invention;

Figure 1 is a longitudinal sectional view of the pump taken on the line 1—1 of Figure 2; and Figure 2 is a view partly in section taken at right angles to Figure 1.

The driving motor 3 may be of any suitable character or construction, but is preferably an electric motor. This motor has the usual outwardly extending bearing 4 for the driving shaft 5'. The bearing 4 and adjacent faces of the motor are preferably turned or finished for engagement with the annular supporting lug or projection 5 on the side of the pump housing 6. The projection or bearing 5 fits closely over the bearing 4 in order to hold the pump in accurate alignment with the motor and is secured thereto by screws 27. The pump housing 6 has a cylinder 7 at its lower end. Any suitable inlet and outlet valves may be used for the pump but such valves do not form a part of the prevent invention. The piston 8 operates in the cylinder 7 and is connected to the crank rod or eccentric rod 9 by means of a pin 10'. The rod 9 is preferably made in two parts 10 and 11 as shown in Figure 1, these parts being connected by a bolt 12. The parts 10 and 11 have eccentric rings 13 and 14 at their upper ends for engagement with the eccentrics 15 and 16 which are secured to or formed integrally with a worm gear 18. This gear is mounted on a shaft 19 which is secured in bearings 20 in the sides of the housing 6. The worm gear 18 engages with and is driven by a worm 21 which is secured to the driving shaft 5' of the motor. An antifriction bearing or thrust bearing 22 is preferably placed between the worm 21 and the bearing 4. A set screw 23 projects through a lug 24 on the housing 6 and engages with the end of the shaft 5' to prevent back play or too much endwise working of the motor shaft. The housing 6 has a cover plate 25 which is held by screws 26.

From this description it will be seen that I provide a convenient method of mounting a pump on a motor and one whereby the worm and worm gear may be accurately aligned and positioned, which is essential for the satisfactory operation of gearing of this character. Furthermore, on account of the split piston rod the pump parts may be readily assembled and when assembled the housing may be supplied with grease, oil or the like, so that the driving parts may operate therein.

Having thus described my invention, what I claim is:

1. The combination of a piston, a gear for actuating said piston, eccentrics on said gear and a two piece eccentric rod connecting the eccentrics and piston.

2. In a pump construction, the combination of a piston, an eccentric rod pivotally connected with the piston and having oppositely disposed duplicate members having their outer ends spaced apart and provided with bearings, a gear having eccentrics engaging with said bearings, a second gear engaging with said first named gear, and means for driving the second gear.

JOHN T. JANETTE.